US009597731B2

(12) United States Patent
Volk

(10) Patent No.: US 9,597,731 B2
(45) Date of Patent: Mar. 21, 2017

(54) ADDITIVE MANUFACTURING DEVICE

(71) Applicant: Incodema3D, LLC, Ithaca, NY (US)

(72) Inventor: Scott Volk, Ithaca, NY (US)

(73) Assignee: Incodema3D, LLC, Ithaca, NY (US)

( * ) Notice: Subject to any disclaimer, the term of this patent is extended or adjusted under 35 U.S.C. 154(b) by 0 days.

(21) Appl. No.: 14/832,586

(22) Filed: Aug. 21, 2015

(65) Prior Publication Data
US 2016/0059308 A1    Mar. 3, 2016

Related U.S. Application Data

(60) Provisional application No. 62/042,890, filed on Aug. 28, 2014.

(51) Int. Cl.
*B33Y 30/00* (2015.01)
*B33Y 10/00* (2015.01)
*B22F 3/105* (2006.01)
*B29C 67/00* (2006.01)
*B33Y 80/00* (2015.01)

(52) U.S. Cl.
CPC ........ *B22F 3/1055* (2013.01); *B29C 67/0085* (2013.01); *B33Y 30/00* (2014.12); *B22F 2003/1056* (2013.01); *B33Y 10/00* (2014.12)

(58) Field of Classification Search
CPC ................................. B22F 3/105; B33Y 30/00
See application file for complete search history.

(56) References Cited

U.S. PATENT DOCUMENTS

| 7,968,626 B2 | 6/2011 | Giller et al. | |
| 8,153,183 B2 | 4/2012 | Skubic et al. | |
| 2012/0291701 A1* | 11/2012 | Grasegger | B29C 67/0085 118/300 |
| 2013/0186558 A1* | 7/2013 | Comb | B29C 67/0051 156/277 |
| 2014/0085620 A1* | 3/2014 | Lobovsky | G03F 7/70775 355/72 |
| 2014/0271328 A1* | 9/2014 | Burris | B23K 26/034 419/53 |

FOREIGN PATENT DOCUMENTS

WO    WO2014/020085    2/2014

OTHER PUBLICATIONS

Teixeira, Antonio, Notification of Transmittal of the International search Report and the Written Opinion of the International searching Authority, or the Declaration for Application No. PCT/US2015/046286, dated Aug. 21, 2015, 12 pages.
"The MakerGear Mosaic 3D Printer—Part VI: The Build Platform", [online]. [accessed on Feb. 5, 2014]. Printed from the internet (Aug. 21, 2015): <URL: http://makezine.com/projects/the-makergear-mosaic-3d-printer-part-vi-the-build-platform/>.

* cited by examiner

*Primary Examiner* — David Sample
*Assistant Examiner* — Lucas Wang
(74) *Attorney, Agent, or Firm* — Fish & Richardson P.C.

(57) ABSTRACT

An additive-manufacturing device including a build chamber. The additive-manufacturing device further includes a base adjustably coupled to the build chamber. The additive-manufacturing device further includes a build platform adjustably coupled to the base and configured to travel, relative to the base and perpendicular to the base.

34 Claims, 12 Drawing Sheets

ADDITIVE MANUFACTURING DEVICE

CROSS REFERENCE TO RELATED APPLICATION

This application claims priority to U.S. Provisional Application Ser. No. 62/042,890, filed on Aug. 28, 2014, the entire contents of which are hereby incorporated by reference.

TECHNICAL FIELD

This document relates to additive manufacturing devices, as well as processes of using such devices and articles made by such processes.

BACKGROUND

Additive-manufacturing is a process of manufacturing whereby a build piece is created by adding a manufacturing medium (e.g., a metal) to a part, as opposed to removing media to create the part. Examples of additive-manufacturing include, but are not limited to, i) additive metal manufacturing, sometimes called powder bed fusion, where a laser or other heat source sinters or melts a metal medium; ii) stereolithography, where a light source cures a photopolymer; and iii) fused deposition modeling, where a thermoplastic is extruded and cools to harden.

SUMMARY

In one aspect, a system includes an additive-manufacturing device that includes a build chamber. The additive-manufacturing device further includes a base adjustably coupled to the build chamber. The additive-manufacturing device further includes a build platform adjustably coupled to the base and configured to travel, relative to the base and perpendicular to the base.

Implementations can include any, all, or none of the following features. The build platform is configured to travel, relative to the base, in a direction perpendicular to the base in response to pressure applied to a build piece by the additive-manufacturing device. The build platform is configured to travel, relative to the base, in a direction perpendicular to the base in response to flexure of a build piece during an additive-manufacturing process. The base is separated from the build platform by springs. At least one spring is positioned above the build platform and at least one spring is positioned below the build platform; and wherein the spring positioned above the build platform has a different stiffness than the spring below the build platform. The build platform includes a spring-couple including two springs and two posts. A first spring surrounds a first posts, a second spring surrounds a second post, and the two springs are between the base and the build platform. The spring-couple includes four springs. A first spring and third spring surround a first post, a second spring and fourth spring surround a second post, and first and second springs are between by the base and the build platform and third and fourth springs are between the build platform and heads of posts. The base is separated from the build platform by motor-driven spacing devices. The base is separated from the build platform by compressible solid spacers. At least one compressible solid spacer is positioned above the build platform and at least one compressible solid space is positioned below the build platform; and the compressible solid spacer positioned above the build platform has a different deformation factor than the compressible solid spacer below the build platform. At least one compressible solid spacer is positioned above the build platform and at least one compressible solid spacer is positioned below the build platform; and the compressible solid spacer positioned above the build platform has a different size than the compressible solid spacer below the build platform. The base is separated from the build platform by pneumatic devices. At least one pneumatic device is positioned above the build platform and at least one pneumatic device is positioned below the build platform; and the pneumatic device above the build platform has a different deformation factor than the pneumatic device below the build platform. The system including a mechanical stop configured to limit the range of travel of the build platform, relative to the base and perpendicular to the base. The mechanical stop is further configured to limit the range of travel of the build platform, relative to the base, in a first direction that is perpendicular to the base more than in a second direction that is perpendicular to the base. The first direction is a direction from the build platform to the base and the second direction is a direction opposite of the first direction. To manufacture a build piece in an additive-manufacturing process, the additive-manufacturing device is configured to sweep a blade over a build piece. The build platform is configured to travel, relative to the base and perpendicular to the base, such that the blade does not latch with the build piece. The build platform is configured to travel, relative to the base and perpendicular to the base, by a distance less than a distance between two neighboring layers of an additive-manufacturing process. The build platform is configured to travel, relative to the base and perpendicular to the base, by a distance less than or equal to 40 µm. The build platform is configured to travel, relative to the base and perpendicular to the base, by a distance greater than or equal to 20 µm. The build platform is configured to travel, relative to the base and perpendicular to the base, by a distance that is less than or equal to 40 µm and greater than or equal to 20 µm. The build platform is configured to travel, relative to the base and perpendicular to the base, by a distance that is less than or equal to 10 mm. The system includes at least a first motion-control device above the build platform, at least a second motion-control device below the build platform, the first motion-control device is different from the second motion-control device. The system of claim 1, wherein, by flexing, the build platform relieves stress in the build piece.

A method includes additively manufacturing an article of manufacture by an additive-manufacturing device comprising: a build chamber; a base adjustably coupled to the build chamber; and a build platform adjustably coupled to the base and configured to travel, relative to the base and perpendicular to the base.

An article of manufacture is manufactured by an additive-manufacturing device comprising a build chamber; a base adjustably coupled to the build chamber; and a build platform adjustably coupled to the base and configured to travel, relative to the base and perpendicular to the base.

Implementations may include one or more of the following advantages. By adjustably coupling a build platform to a base in an additive-manufacturing device, the failure rate of the additive-manufacturing device may be reduced. For example, the build platform may move in response to pressure applied to or by a build piece on the built platform, thereby reducing the possibility of breaking the build piece by the pressure. As another example, when a blade of a powder-based machine sweeps across a surface of a build piece with small distortions, the build platform may move instead of allowing the blade to latch onto the build piece.

In another example, small distortions can accumulate over a build piece and create significant internal stress, and allowing the build platform to move and flex can allow a build piece to flex during the build, thereby reducing internal stress in the build piece.

DESCRIPTION OF DRAWINGS

Like reference symbols in the various drawings indicate like elements

DETAILED DESCRIPTION

An additive-manufacturing device can have a base and a build platform that are adjustably coupled, and the build platform can be configured to travel perpendicular to the base and to flex. In such a device, build pieces that might otherwise be damaged and rejected can be manufactured without damage. For example, when pressure is applied to a build piece on a build platform, the build platform may deflect, easing pressure on the build piece and preventing it from breaking or halting the movement of the object applying the pressure. In another example, stresses developed in a build piece may be reduced when the build platform flexes.

Figure 1:
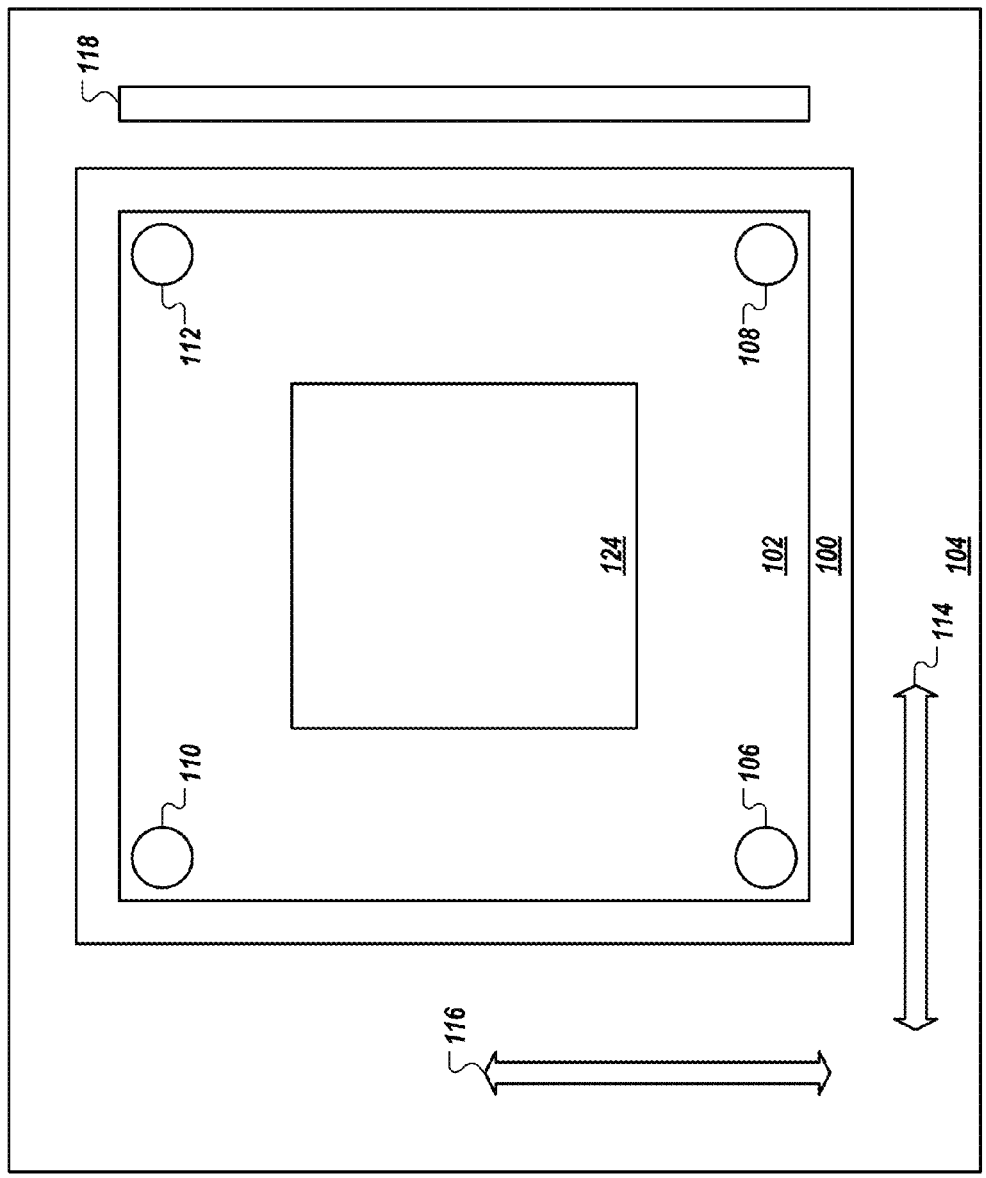
FIG. 1 shows a top view of the base and build platform of an additive-manufacturing device.
Figure 2:
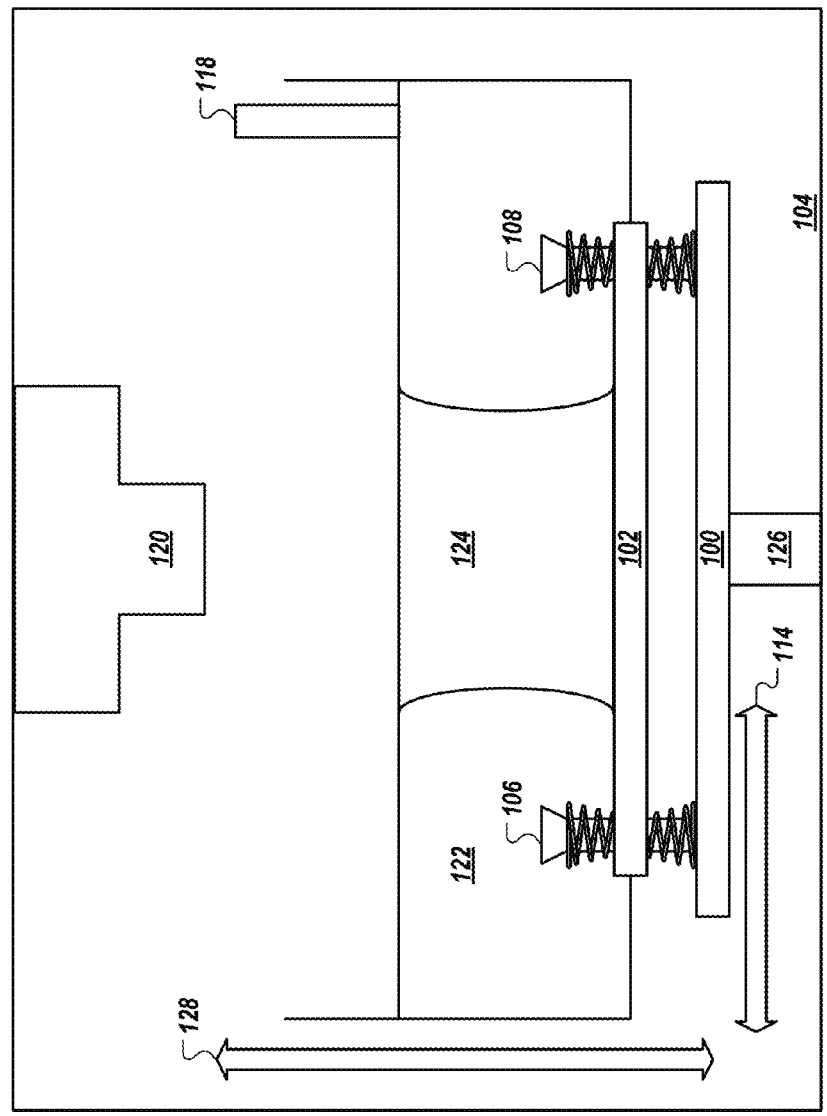
FIG. 2 shows a side view of the base and build platform of an additive-manufacturing device.

FIG. 1 shows a top view of a base 100 and a build platform 102 in a build chamber 104 of an additive-manufacturing device. FIG. 2 shows a side view of the base 100 and the build platform 102 of an additive-manufacturing device. As shown in FIG. 1, the build platform 102 is adjustably coupled to the base by four adjustable couples 106, 108, 110, and 112. The build chamber 104 is oriented such that the x-direction 114 and the y-direction 116 are coplanar with the base 100 and the platform 102, and the z-direction 128 is perpendicular to the base 100 and the platform 102. The additive-manufacturing device may include other elements. For example, the additive-manufacturing device shown here is a direct metal printer, and includes a blade 118 for transporting and smoothing metal powder build material 122 and a laser 120 for melting or sintering the build material 122 to create a build piece 124. For example, a fused deposition modeling (FDM) additive-manufacturing device may include a heater, nozzle, and wax or thermoplastic build material.

In general, an additive-manufacturing device is a device that can receive a build plan and create a build piece from the build plan. Build plans are often created by slicing a three dimensional (3D) drawing or definition of a desired part into layers according to a particular file format. Example file formats include, but are not limited to the Standard Tessellation Language (STL), Additive Manufacturing File Format (AMF), and Polygon File Format (PLY). In the example shown in FIG. 2, the additive-manufacturing device is creating a build piece 124 on the build platform 102 based on a build plan. To do so, the additive-manufacturing device can be configured to cause the blade 118 to sweep a layer of build material 122 across the build platform 102. Next, the laser 120 can melt or sinter some of this layer of build material 122, matching the shape of one of the layers of the build plan. After this, the base 100 is lowered by a pillar 126 that is configured to move in the z-direction 128. Then, the process is repeated, beginning with the blade 118 sweeping a layer of build material 122 across the now-lowered build piece. This layer-wise printing process can be repeated until the build piece 124 is completed.

In the process of creating the build piece 124, pressure or force may be applied to the build piece 124. For example, the blade 118, while sweeping across the top of the build material 122, may come into contact with the build piece 124.

In such cases, the build platform 102 can travel relative to, and perpendicular to, the base 100 to alleviate some of the force or pressure applied to the build piece 124. As the build platform 102 is attached to the base 100 by one or more adjustable couples 106-112, the build platform 102 can adjust its height and orientation relative to the base 100. Four adjustable couples 106, 108, 110, and 112 are shown here, but more, fewer, and/or different types of adjustable couples can be used. A greater number of couples may be used, for example, for very large build platforms or for build pieces that are particularly heavy. The additional couples may be, for example, in a rectangular shape, a hexagonal shape, or any other appropriate shape. Examples of the build platform 102 traveling is shown in FIGS. 3-6 below.

In these cases, the adjustable couples can return the build platform 102 to its original location and orientation, relative to the base 100, when the pressure or force is no longer applied. The mechanism by which the adjustable couples 106, 108, 110, and 112 permit the build platform 102 to move can vary. For example, shown here are springs above and below the build platform 102 and on posts, but other types are possible. Some other exemplary adjustable couples are described with respect to FIG. 8 below.

Additionally or alternatively, the process of building the build piece 124 may introduce internal stresses to the build piece 124. For example, when metal powder is welded or sintered, as is the case in a direct-metal process, the solid metal is temporarily melted into a liquid form before solidifying back to a solid form as part of the build piece 124. This melting and solidifying process can introduce internal stresses to the build piece 124. In some configurations of direct-metal processing and/or other processes, other causes of internal stresses are possible.

Figure 5:
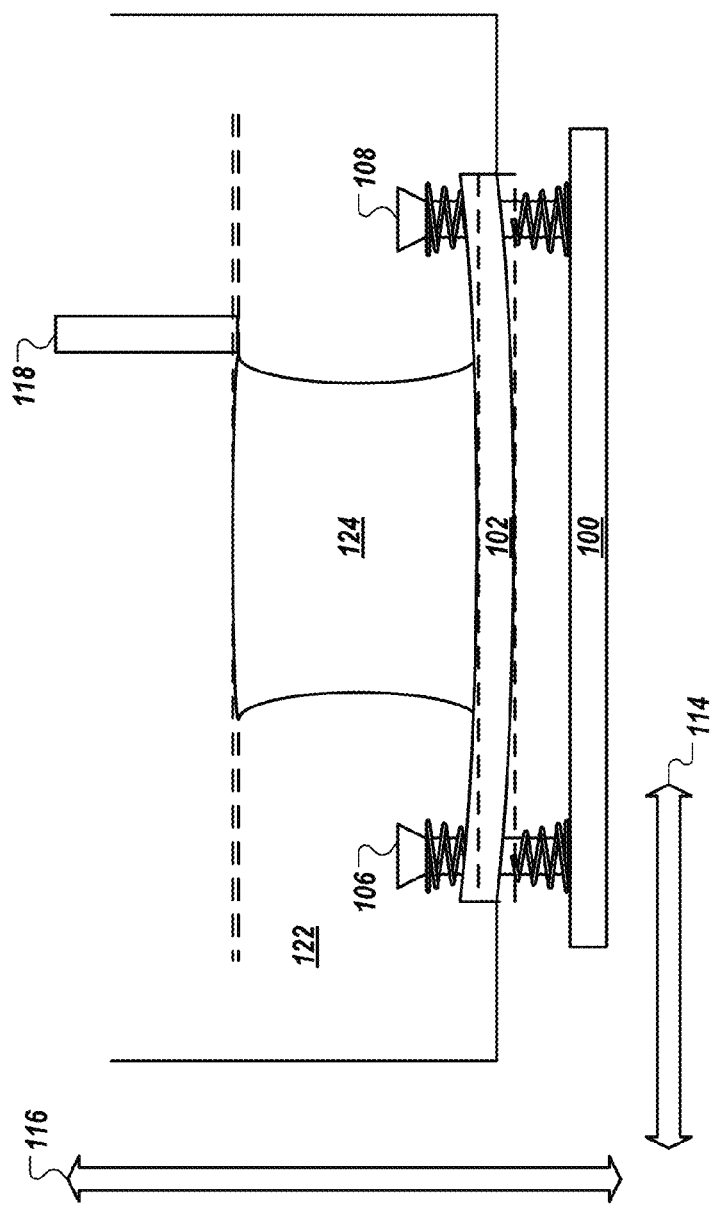
FIGS. 5 and 6 show a side view of a blade sweeping over a build piece with distortions causing internal stresses.

In order to alleviate some or all of these internal stresses, the build platform 102 may be configured to flex, bow, or otherwise change shape to accommodate the build piece 124. An example of such a flexure is shown in FIG. 5 below.

Figure 3:
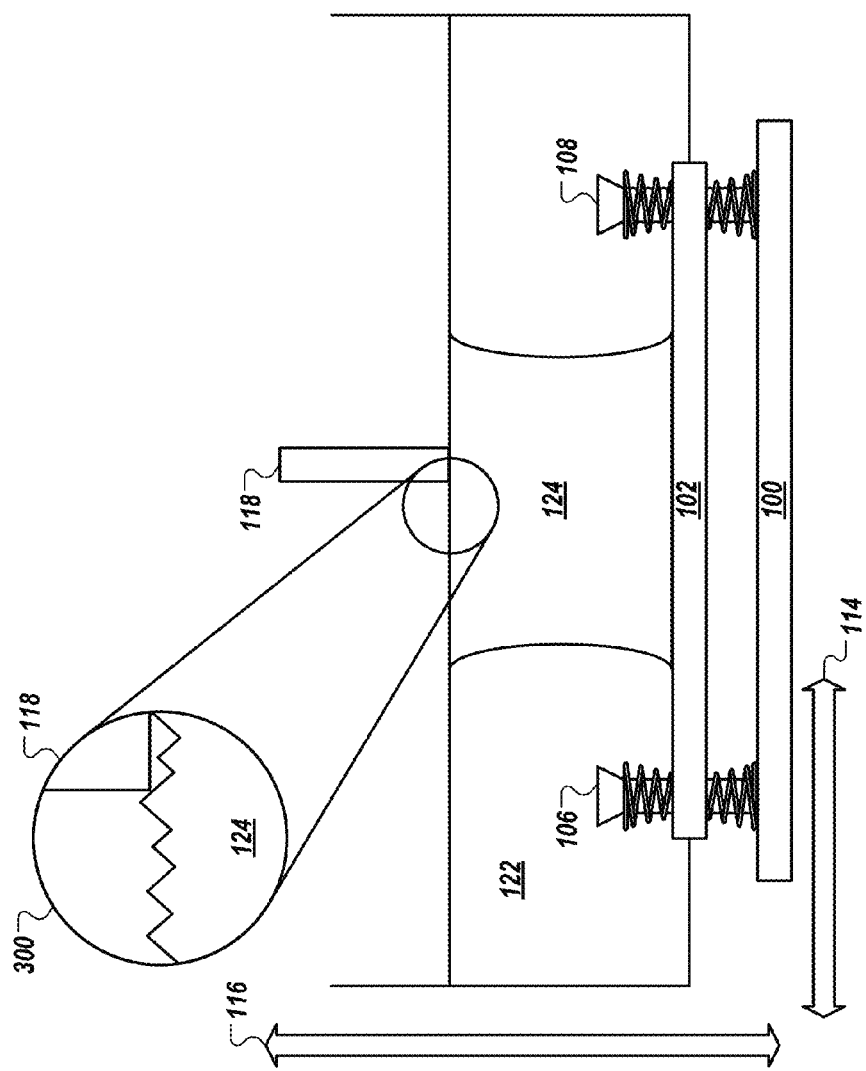
FIGS. 3 and 4 show a side view of the blade sweeping over a surface imperfection of the build piece.
Figure 4:
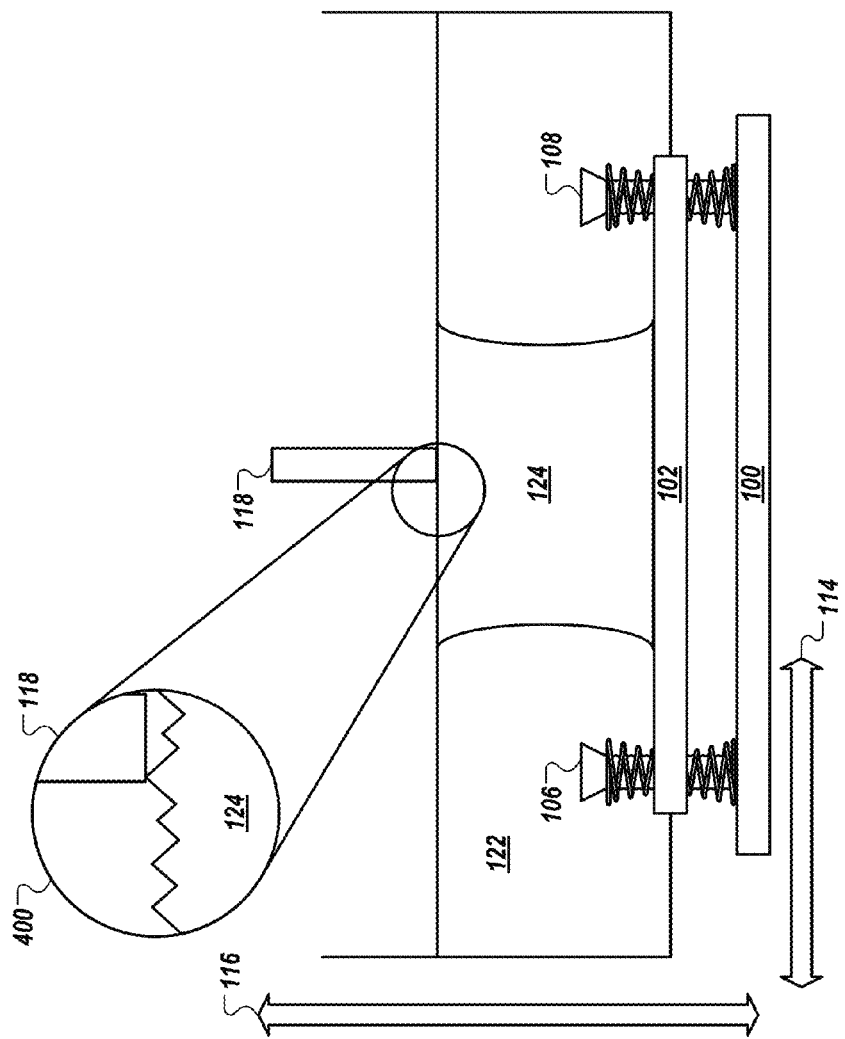

FIGS. 3 and 4 show a side view of the blade 118 sweeping over a surface imperfection of the build piece 124. In the process of creating the build piece 124, surface imperfections may be created. These imperfections may be the result of, for example, imperfect spreading of the build material 122, power fluctuations of the laser 120, or causes. Additionally, the imperfections may be the result of successive layers with printing errors that are each within acceptable parameters, but the aggregate of which result in a large enough imperfection to affect the printing process.

Of note is that some or all of the figures shown are not to scale, and certain exaggerations have been made for purposes of explanation. For example the adjustable couples 106 and 108 are shown disproportionality large and unrecessed. However, the top of the adjustable couples 106, 108 may be configured to be within recesses within the build platform 102 in order to permit the blade 118 to sweep across the build platform 102 and/or build piece 124 without making contact with the adjustable couples 106, 108. Similarly, some or all of the stops 700 shown in FIG. 7 may be recessed within the build platform 102.

In FIGS. 3 and 4, the blade 118 is sweeping across the surface of the build piece 124 in the x-direction 114, from right to left as shown. In FIG. 3, magnification window 300 shows that the surface of the build piece 124 has an irregular saw-tooth shape. In FIG. 3, the blade 118 is about to make contact with one of the saw-tooth shapes.

In FIG. 4, magnification window 400 shows that the build piece 124 has been pressed down by the blade 118 making contact with the saw-tooth shape of the build piece 124. In this example, the build piece is rigidly attached to the build platform 102, and the build platform is adjustably coupled to the base 100 by the adjustable couples 106, 108, 110, and 112. As such, when force is applied to the build piece 124 by the blade 118, the build piece 124 can transmit that force to the base 102, and then, in this example, to the springs of the adjustable couples 106, 108, 110, and 112. Instead of holding the build piece 124 unmoving in space, springs of the adjustable couples 106, 108, 110, and 112 can compress and expand, allowing the build platform 102 and the build piece 124 to travel relative to the base 100 and/or change orientation.

If the build piece 124 was held unmoving in space, it is possible that the blade 118 may become latched to the build piece 124, causing the build piece to break and/or halting the blades sweep across the build piece 124. In either case, the latching would be likely to cause a failure of the build process, resulting in lost material, time, and energy.

Figure 6:
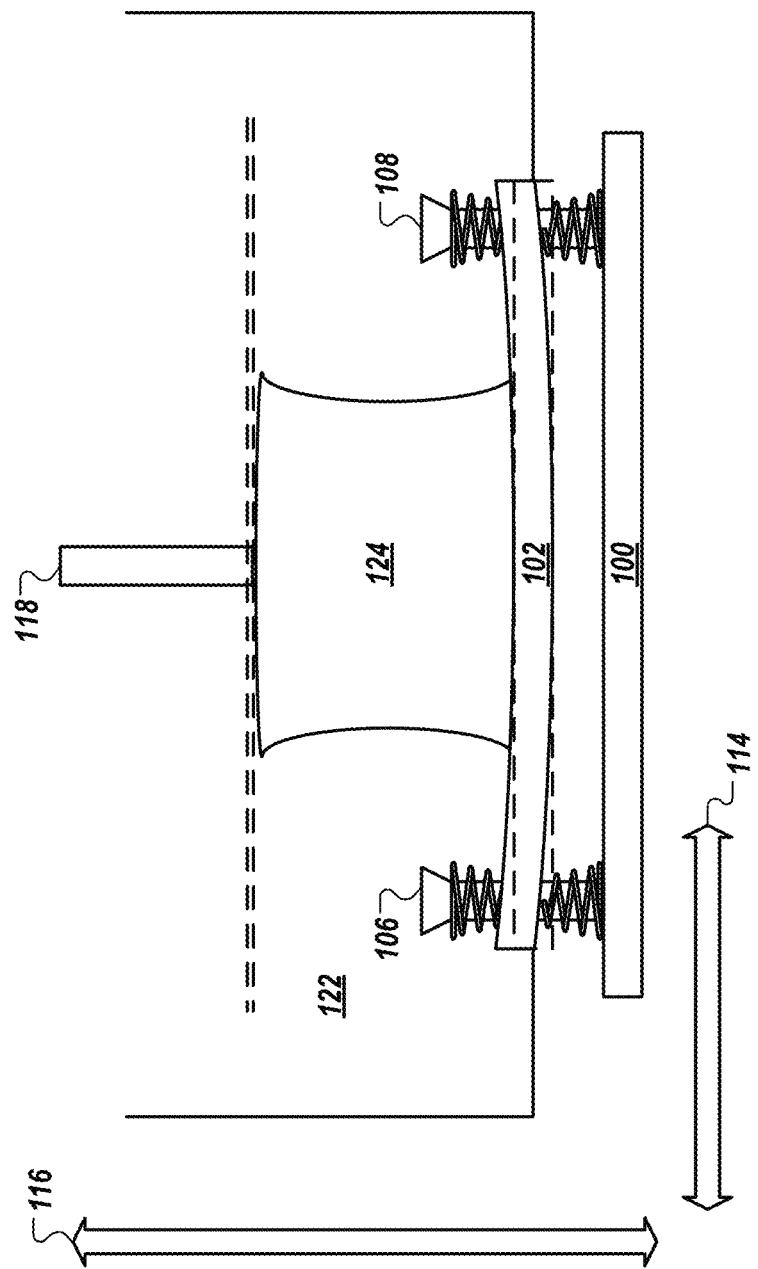

FIGS. 5 and 6 show a side view of a blade sweeping over a build piece with distortions causing internal stresses. In this example, the stress has caused the middle sections of the top and bottom of the build piece 124 to bow out. In response, the build platform 102 bows to accommodate the build piece 124. Additionally, the build platform 102 moves in the z-axis as the blade 118 sweeps over the build piece's 124 curved upper surface.

Similar to as shown in FIGS. 3 and 4, the blade 118 is sweeping across the surface of the build piece 124 in the x-direction 114, from right to left as shown. As the upper surface of the build piece 124 is bowed, the blade 118 will make contact with the build piece 124 and force the build platform 102 to move downward in the z-direction 116.

Figure 7:
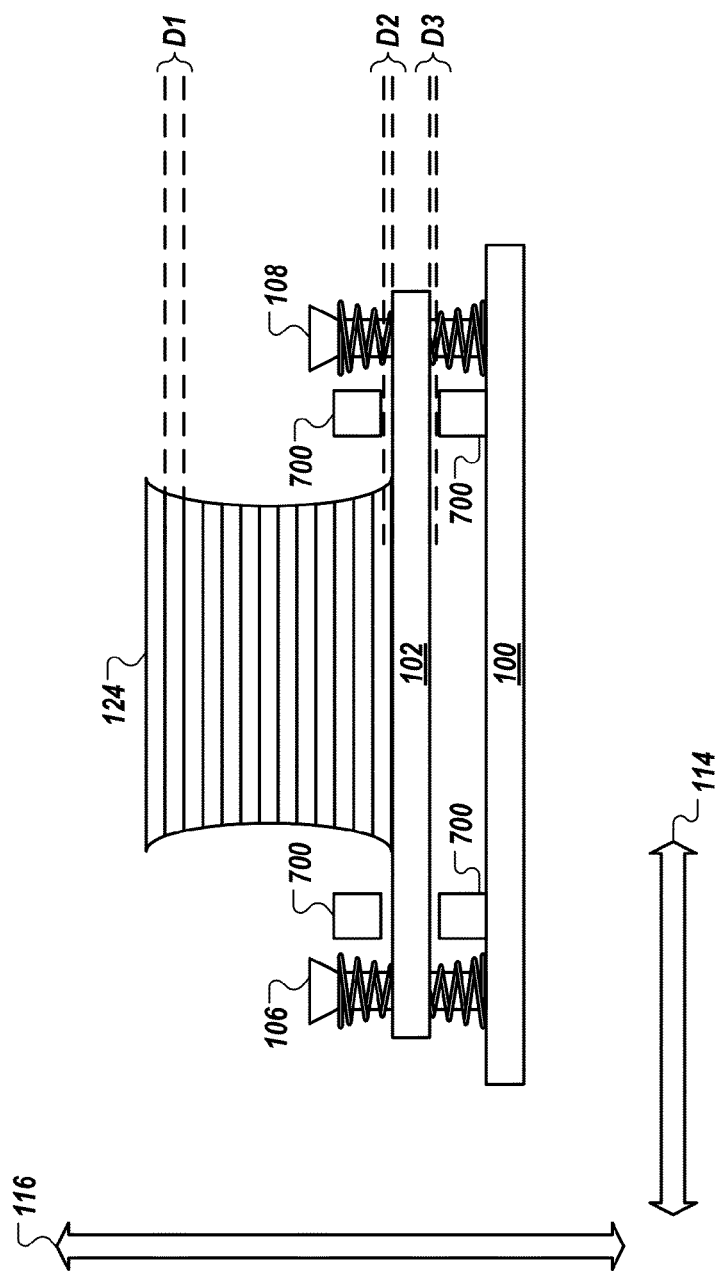
FIG. 7 shows a range of movement of the build platform.

As shown, the build platform 102 has also flexed. In FIGS. 5 and 6, the flexed build platform 102 is shown with solid lines, and the original, unflexed shape is shown with superimposed dotted lines. As part of the manufacturing process, the build piece 124 is rigidly connected to the build platform 102, and stresses in the build piece 124 lead to deformations of the build piece 124, which lead to the flexing of the build platform 102. By way of comparison, if the build platform was sufficiently rigid or inflexible, the internal stresses of the build piece 124 may, for example, cause the build piece 124 to fracture, de-couple from the build platform 102, or otherwise release those internal stresses in a way that may cause the build operation to fail. However, by allowing the build platform 102 to flex, the build piece 124 may be completed without failure FIG. 7 shows a range of movement of the build platform 100. As previously described, the build piece 124 can be created in a layer-wise process in which a layer of build material 122 is melted or sintered on top of a previous layer of the build piece 124. For illustrative purposes, those layers are shown in FIG. 7. In this example, every layer has the same thickness D1. However, some processes may create build pieces with layers of variable thickness, and layers may be of different types of build materials (e.g. a layer of an adhesive material followed by a layer of paper), or other configurations.

Mechanical stops 700 are shown above and below the build platform 102. These mechanical stops can be used to limit the travel distance of the build platform 102, whether that travel distance is measured in absolute values in the z-direction 128, relative and perpendicular to the base 100, or otherwise. The mechanical stops can be configured to be adjusted, for example by a processor of the additive-manufacturing device or by the manual rotation of one or more screws. Although now shown here, the mechanical stops 700, such as the mechanical stops 700 above the build platform 700 may be configured to be within recesses of the build platform 102, for example to allow a blade to pass over the build platform 102 and/or the build piece 124

The mechanical stops 700, or other features of the additive-manufacturing device, can permit upward travel of the build platform 102 to a distance of D2 and downward travel of the build platform 102 to a distance of D3.

The relationships and values of D1, D2, and D3 may be set, for example, in a build plan and/or by an operator responsible for executing the build plan. In this example, D1 is greater than either D2 or D3, and D3 is greater than D2. In other examples, other relationships are possible. For example, D2 and D3 may be set to be equal.

For some applications, D2 may be set to a value of 10 mm or less, and D3 may be set to a value from 20 µm to 40 µm layer depth. This type of configuration may be useful, for example, for direct metal printing of build pieces made of steel, nickel, or titanium. In another example, D2 may be set to a value of 8 mm, and D3 may be set to a value of 15 µm. In yet another example, D2 may be set to a value of 20 mm or less, and D3 may be set to any value less than D2. However, D2 need not necessarily be less than D3.

Figure 8:
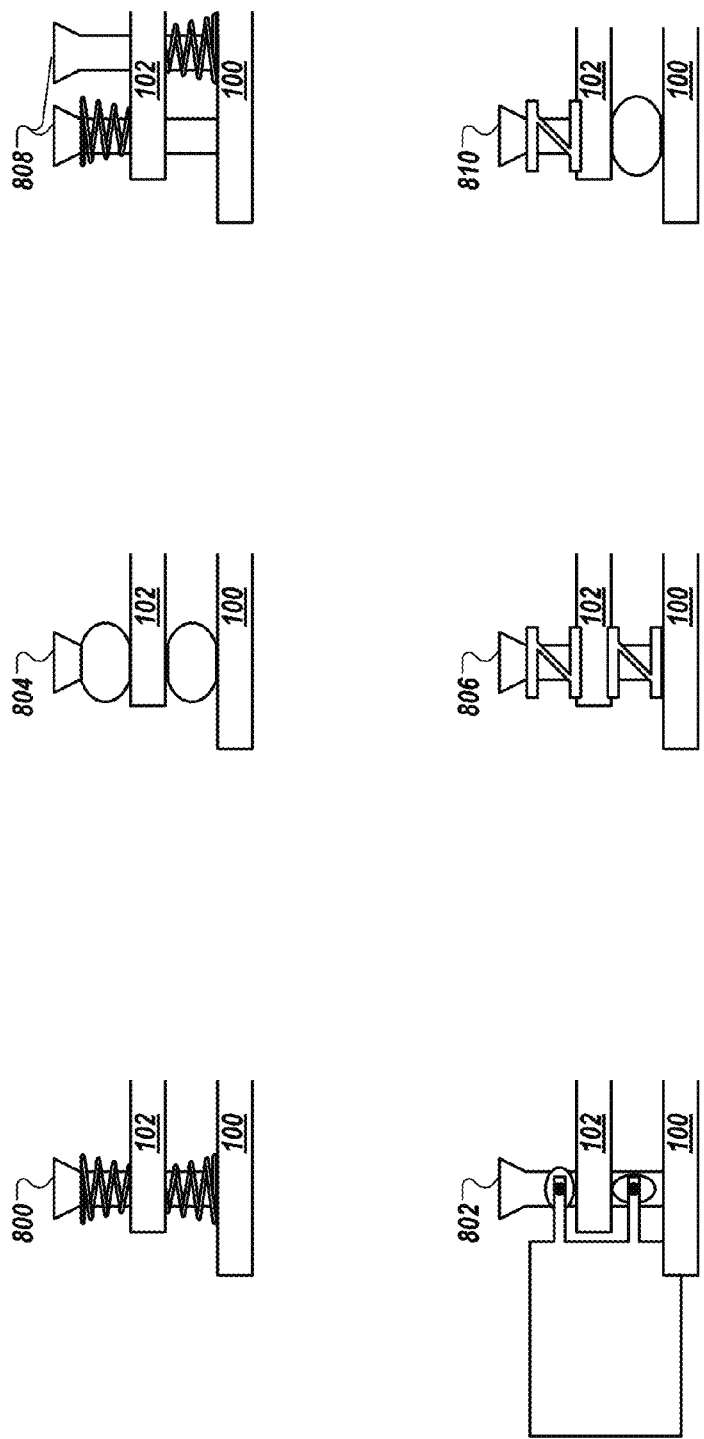
FIG. 8 shows examples of different types of adjustable couples between a base and a build platform.

FIG. 8 shows examples of different types of adjustable couples between a base and a build platform. FIGS. 1-7 show an additive-manufacturing device that has four adjustable couples 106, 108, 110, and 112 in the form of spring couples, where each of the spring couples has a single post, a spring above the build platform 102 surrounding the post, and a spring below the build platform 102 surrounding the post. However, other types, numbers of, and configurations of adjustable couples are possible.

Spring couple 800 is an adjustable couple with a single post affixed to the base 100 and passing through the build platform 102. Surrounding the post are two springs, one above the build platform 102 and one below the build platform 102. In some configurations, the spring or springs above the build platform 102 have a different stiffness than the spring or springs below the build platform 102. For example, it may be desirable for the build platform to move upward more easily than downward. In such a case, the spring or springs above the build platform 102 may be less stiff than the spring or springs below the build platform 102. In some cases, the springs may be partially compressed on the spring couple 800, and when at rest, the build platform 102 may not fully compress either spring. The total travel distance in either direction may be limited, for example, by the distance needed to fully compress one of the springs.

The size, characteristics, and number of the springs may be configured or selected based on, for example, parameters such as the desired travel distance of the build platform 102, the force with which a blade may move, and the estimated weight of build material to be supported.

The springs in the spring couple 800 may have an inside diameter greater than the outside diameter of the post. For example, if the post is a screw with an outside diameter of 45 mm, the springs may have an inside diameter of 50.5 mm. For other configurations sizes, other inside diameters may be appropriate.

The springs may have any appropriate length at rest and under load. For example, in some configurations, spring length at rest may range from about 90 mm to about 300 mm. Spring deflection under full load may range from about 20 mm to about 100 mm. The springs may have a spring constant K ranging from, for example, around 3 kg/mm to around 80 kg/mm. However, other values, including values outside of one or more of those ranges described above, may be used.

Motor couple 802 is an adjustable couple that is controlled by one or more motor-driven spacing devices. In this example, a motor can drive two rotationally-offset cams to control the location of the build platform 102. In other examples, other motor-driven elements may be used. For example, a worm gear may be rotated through a threaded hole in the build platform 102 to control the location of the build platform. When using a motor couple 802, it is possible to use one or more pressure sensors (not shown) to sense when pressure or force is applied to a build piece and/or the build platform 102. In response to detecting this pressure or force, the motor couple 802 can be engaged to adjust the location of the build platform 102 until, for example, the force or pressure is no longer sensed or is below a threshold.

Compression couple 804 is an adjustable couple with a single post affixed to the base 100 and passing through the build platform 102. Surrounding the post are two compressive solid spacers, one above the build platform 102 and one below the build platform 102. In some configurations, the compressive solid spacer or spacers above the build platform 102 have a different deformation factor than the compressive solid spacer or spacers below the build platform 102. For example, it may be desirable for the build platform to move downward more easily than upward. In such a case, the compressive solid spacer or spacers above the build platform 102 may have a smaller deformation factor than the compressive solid spacer or spacers below the build platform 102. Additionally or alternatively, the compressive solid spacers above and below the build platform 102 may be of different sizes.

Pneumatic couple 806 is an adjustable couple with a single post affixed to the base 100 and passing through the build platform 102. Surrounding the post two are pneumatic devices, one above the build platform 102 and one below the build platform 102. In some configurations, the pneumatic device or devices above the build platform 102 have a different deformation factor than the pneumatic device or devices below the build platform 102. For example, it may be desirable for the build platform to move downward more easily than upward. In such a case, the pneumatic device or devices above the build platform 102 may have a smaller deformation factor than the pneumatic device or devices below the build platform 102.

Spring couple 808 is an adjustable couple with two posts affixed to the base 100 and passing through the build platform 102. Each post is surrounded by one spring. One spring is above the build platform 102 on one post and the other spring is below the build platform 102 on the other post. In some configurations, the spring or springs above the build platform 102 have a different stiffness than the spring or springs below the build platform 102. For example, it may be desirable for the build platform to move upward more easily than downward. In such a case, the spring or springs above the build platform 102 may be less stiff than the spring or springs below the build platform 102.

Hybrid couple 810 is an adjustable couple with different motion-control devices (e.g., a spring, a motor-driven spacing device, a compressive solid spacer, or a pneumatic device) above and below the build platform 102, resulting in different motion control above and below the build platform. In this example, a pneumatic device is positioned around the post above the build platform 102 and a compressive solid spacer is positioned around the post below the build platform 102. However, other configurations are possible, and would qualify as a hybrid couple as long as the couple has a different device above the build platform 102 than below the build platform 102.

Each adjustable couple shown here includes at least one post. However, a greater number of posts are possible. Additionally, adjustable couples without posts are also possible. For example, one or more actuators connected to the build platform 102 and the base 100 may be used. In another example, a compressible bladder connected to the build platform 102 and the base 100 may be used.

Figure 9:
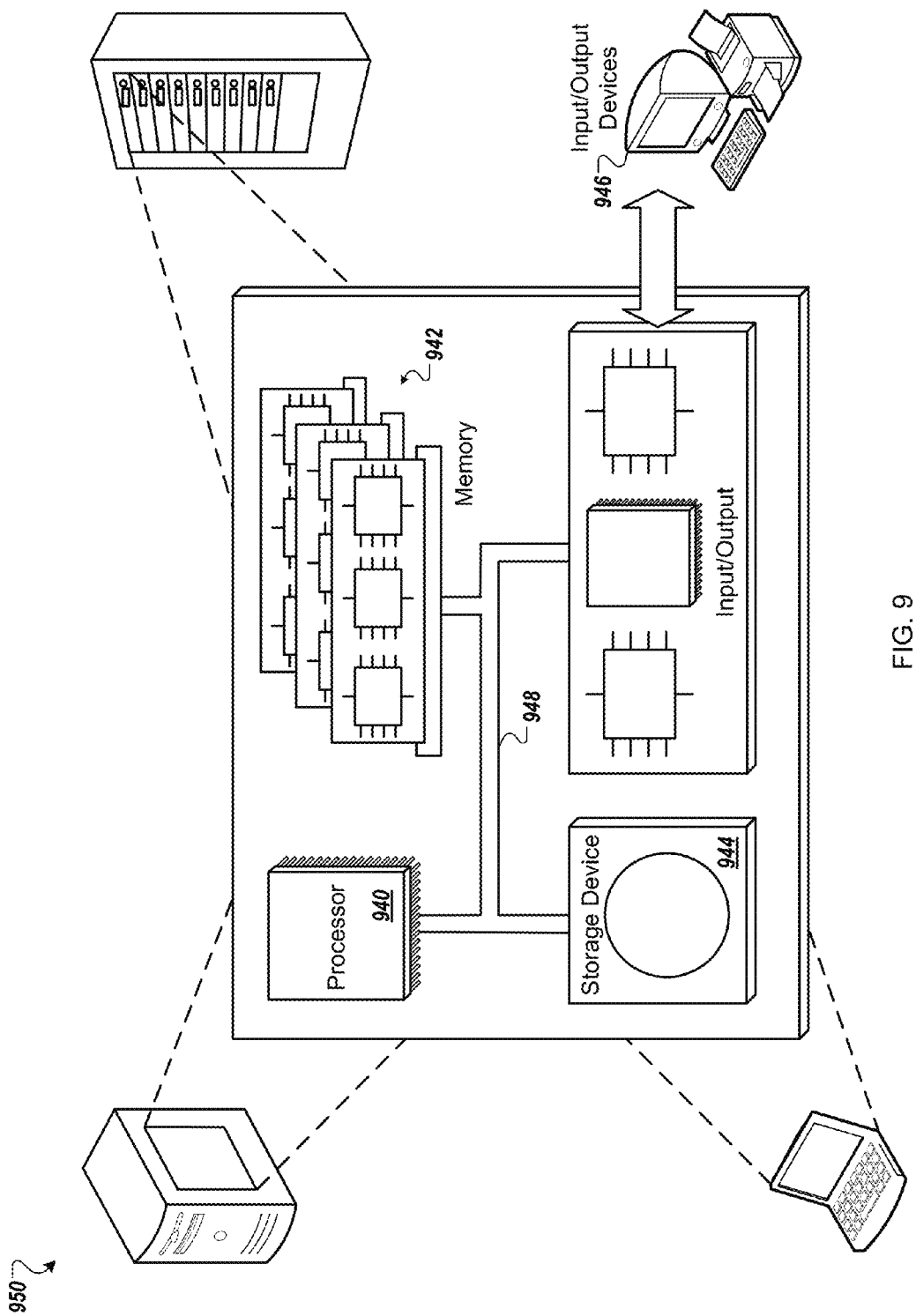
FIG. 9 is a schematic diagram that shows an example of a computing system.

FIG. 9 is a schematic diagram that shows an example of a computing system 900. The computing system 900 can be used for some or all of the operations described previously, according to some implementations. The computing system 900 includes a processor 910, a memory 920, a storage device 930, and an input/output device 940. Each of the processor 910, the memory 920, the storage device 930, and the input/output device 940 are interconnected using a system bus 950. The processor 910 is capable of processing instructions for execution within the computing system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the computing system 900. In some implementations, the memory 920 is a computer-readable medium. In some implementations, the memory 920 is a volatile memory unit. In some implementations, the memory 920 is a non-volatile memory unit.

The storage device 930 is capable of providing mass storage for the computing system 900. In some implementations, the storage device 930 is a computer-readable medium. In various different implementations, the storage device 930 may be a floppy disk device, a hard disk device, an optical disk device, or a tape device.

The input/output device 940 provides input/output operations for the computing system 900. In some implementations, the input/output device 940 includes a keyboard and/or pointing device. In some implementations, the input/output device 940 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Figure 10:
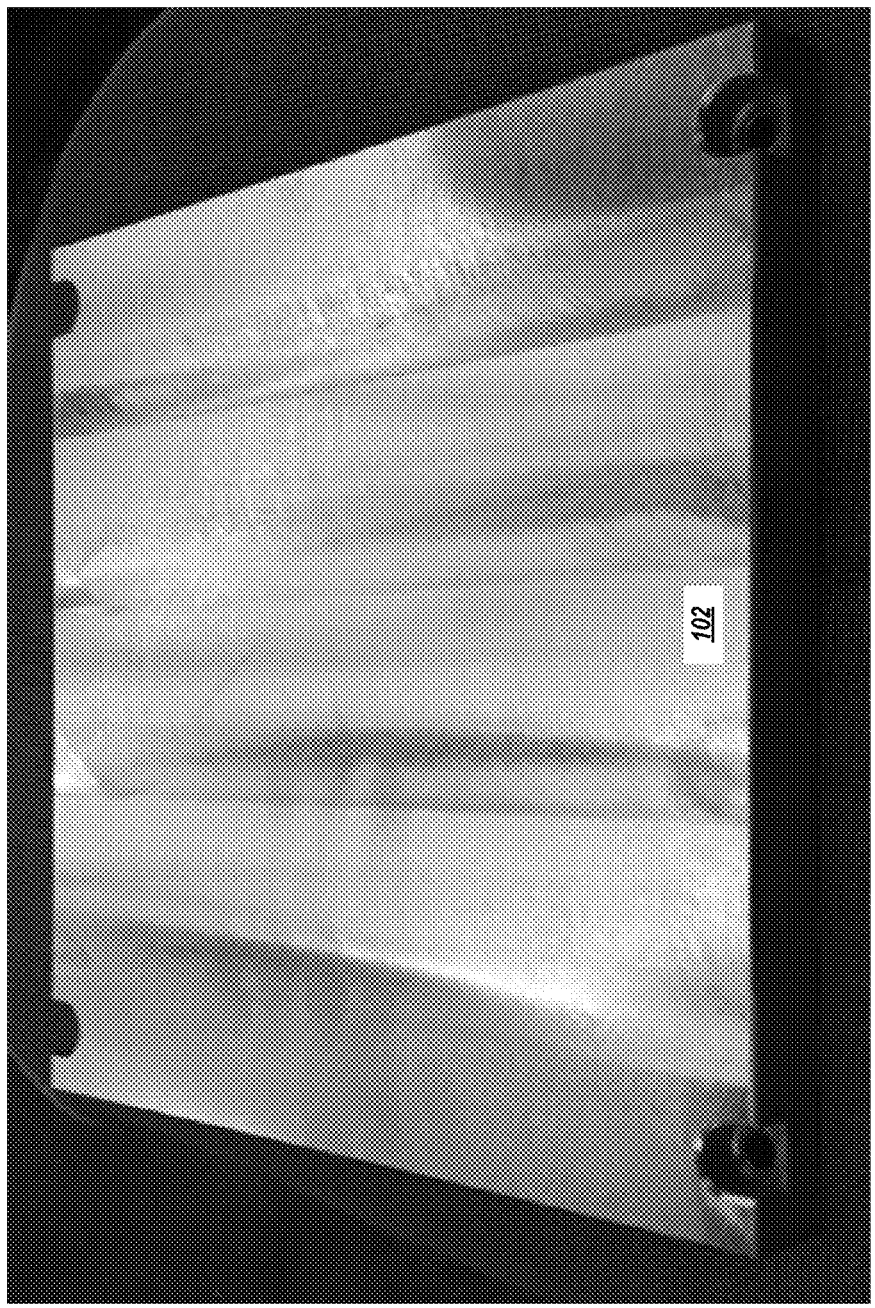
FIGS. 10-12 are photographs of an example build platform with recesses.
Figure 11:
Figure 12:
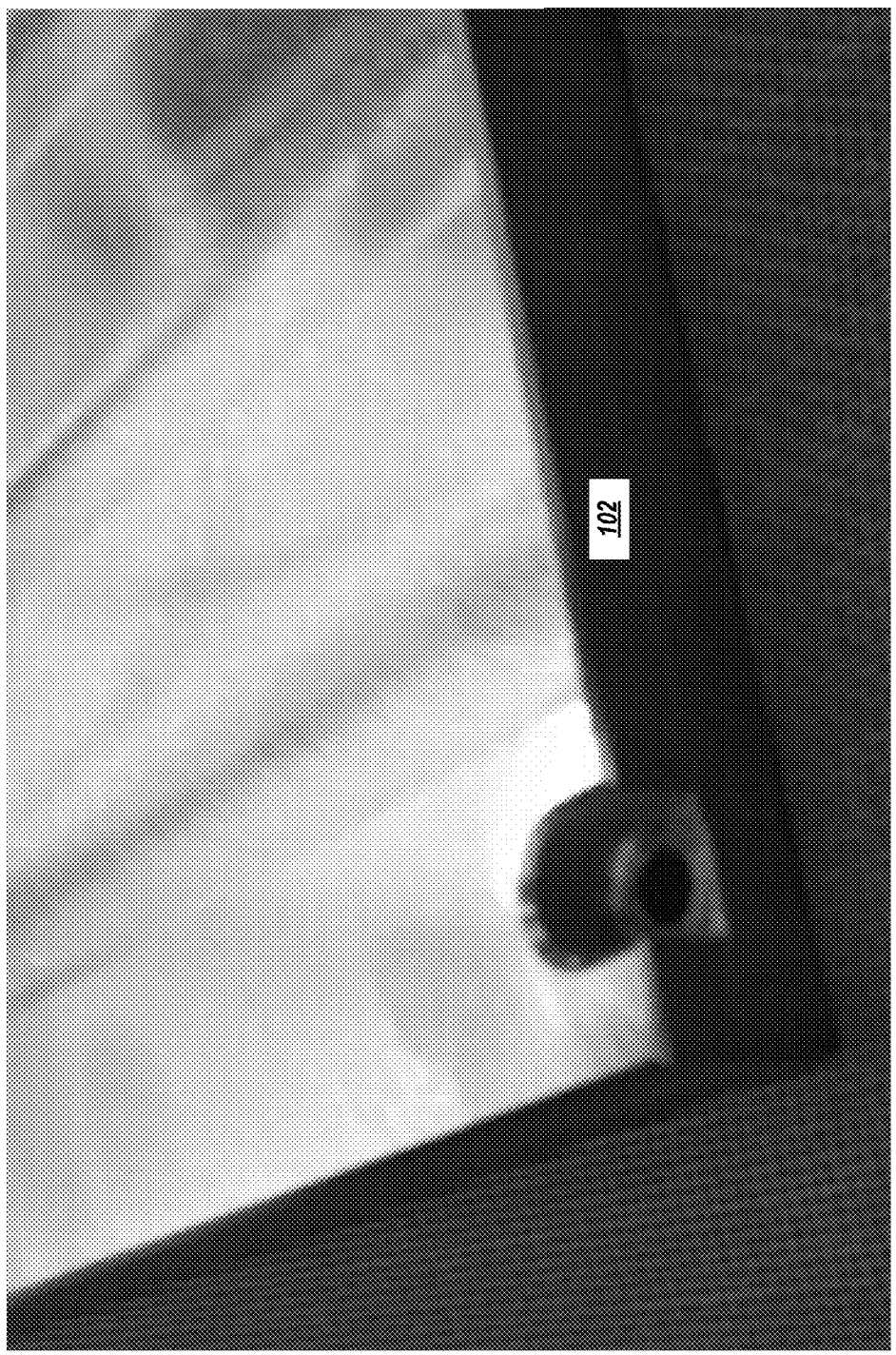

FIGS. 10-12 are photographs of an example build platform 102 with recesses.

As shown, the build platform 102 may be configured with four recessed pockets to house adjustable couples such as the adjustable couples describes with respect to FIG. 8 or other adjustable couples. These adjustable couples may then limit the travel distance of the build platform 102 in the z-direction 128 without interfering with the blade 118 or other elements of the additive manufacturing process.

What is claimed is:

1. A system, comprising:
an additive-manufacturing device comprising:
a build chamber;
a base adjustably coupled to the build chamber;
a build platform adjustably coupled to the base and configured to travel, relative to the base and perpendicular to the base, in response to force applied to the build platform by a build piece; and
a device for depositing a build material above the build platform.

2. The system of claim 1, wherein the force is applied to the build platform by the build piece as a result of pressure applied to the build piece by the additive-manufacturing device.

3. The system of claim 1, wherein the force is applied to the build platform by the build piece as a result of flexure of the build piece during an additive-manufacturing process.

4. The system of claim 1, wherein the base is separated from the build platform by springs.

5. The system of claim 4, wherein at least one spring is positioned above the build platform and at least one spring is positioned below the build platform; and
wherein the spring positioned above the build platform has a different stiffness than the spring below the build platform.

6. The system of claim 4, wherein the build platform comprises a spring-couple comprising two springs and two posts.

7. The system of claim 6, wherein a first spring surrounds a first post, a second spring surrounds a second post, and the two springs are between the base and the build platform.

8. The system of claim 6, wherein the spring-couple comprises four springs.

9. The system of claim 8, wherein a first spring and third spring surround a first post, a second spring and fourth spring surround a second post, and first and second springs are between by the base and the build platform and third and fourth springs are between the build platform and heads of posts.

10. The system of claim 1, wherein the base is separated from the build platform by motor-driven spacing devices.

11. The system of claim 1, wherein the base is separated from the build platform by compressible solid spacers.

12. The system of claim 11, wherein at least one compressible solid spacer is positioned above the build platform and at least one compressible solid space is positioned below the build platform; and
wherein the compressible solid spacer positioned above the build platform has a different deformation factor than the compressible solid spacer below the build platform.

13. The system of claim 11, wherein at least one compressible solid spacer is positioned above the build platform and at least one compressible solid spacer is positioned below the build platform; and
wherein the compressible solid spacer positioned above the build platform has a different size than the compressible solid spacer below the build platform.

14. The system of claim 1, wherein the base is separated from the build platform by pneumatic devices.

15. The system of claim 14, wherein at least one pneumatic device is positioned above the build platform and at least one pneumatic device is positioned below the build platform; and
wherein the pneumatic device above the build platform has a different deformation factor than the pneumatic device below the build platform.

16. The system of claim 1, further comprising a plurality of mechanical stops configured to limit the range of travel of the build platform, relative to the base and perpendicular to the base.

17. The system of claim 16, wherein the mechanical stops are further configured to limit, from rest, the range of travel of the build platform, relative to the base, in a first direction that is perpendicular to the base more than in a second direction that is perpendicular to the base.

18. The system of claim 17, wherein the first direction is a direction from the build platform to the base and the second direction is a direction opposite of the first direction.

19. The system of claim 1, wherein to manufacture the build piece in an additive-manufacturing process, the additive-manufacturing device is configured to sweep the device over the build piece.

20. The system of claim 19, wherein the build platform is configured to travel, relative to the base and perpendicular to the base, such that the device does not latch with the build piece.

21. The system of claim 1, wherein the build platform is configured to travel, relative to the base and perpendicular to the base, by a distance less than a distance between two neighboring layers of an additive-manufacturing process.

22. The system of claim 1, wherein the build platform is configured to travel, relative to the base and perpendicular to the base, by a distance less than or equal to 40 µm.

23. The system of claim 1, wherein the build platform is configured to travel, relative to the base and perpendicular to the base, by a distance greater than or equal to 20 µm.

24. The system of claim 1, wherein the build platform is configured to travel, relative to the base and perpendicular to the base, by a distance that is less than or equal to 40 µm and greater than or equal to 20 µm.

25. The system of claim 1, wherein the build platform is configured to travel, relative to the base and perpendicular to the base, by a distance that is less than or equal to 10 mm.

26. The system of claim 1, comprising at least a first motion-control device above the build platform, at least a second motion-control device below the build platform, the first motion-control device is different from the second motion-control device.

27. The system of claim 1, wherein, by flexing, the build platform relieves stress in the build piece.

28. A method comprising:
additively manufacturing an article of manufacture by an additive-manufacturing device comprising:
a build chamber;
a base adjustably coupled to the build chamber;
a build platform adjustably coupled to the base and configured to travel, relative to the base and perpendicular to the base, in response to force applied to the build platform by a build piece; and
a device for depositing a build material above the build platform.

29. A system, comprising:
an additive-manufacturing device comprising:
a build chamber;
a base adjustably coupled to the build chamber; and
a build platform adjustably coupled to the base and configured to travel, relative to the base and perpendicular to the base;
wherein the base is separated from the build platform by springs;
wherein at least one spring is positioned above the build platform and at least one spring is positioned below the build platform; and
wherein the spring positioned above the build platform has a different stiffness than the spring below the build platform.

30. A system, comprising:
an additive-manufacturing device comprising:
a build chamber;
a base adjustably coupled to the build chamber; and
a build platform adjustably coupled to the base and configured to travel, relative to the base and perpendicular to the base;
wherein the base is separated from the build platform by springs
wherein the build platform comprises a spring-couple comprising two springs and two posts;
wherein the spring-couple comprises four springs; and
wherein a first spring and third spring surround a first post, a second spring and fourth spring surround a second post, and first and second springs are between by the base and the build platform and third and fourth springs are between the build platform and heads of posts.

31. A system, comprising:
an additive-manufacturing device comprising:
a build chamber;
a base adjustably coupled to the build chamber; and
a build platform adjustably coupled to the base and configured to travel, relative to the base and perpendicular to the base;
wherein the base is separated from the build platform by compressible solid spacers;
wherein at least one compressible solid spacer is positioned above the build platform and at least one compressible solid space is positioned below the build platform; and
wherein the compressible solid spacer positioned above the build platform has a different deformation factor than the compressible solid spacer below the build platform.

32. A system, comprising:
an additive-manufacturing device comprising:
a build chamber;
a base adjustably coupled to the build chamber; and
a build platform adjustably coupled to the base and configured to travel, relative to the base and perpendicular to the base;
wherein the base is separated from the build platform by compressible solid spacers;
wherein at least one compressible solid spacer is positioned above the build platform and at least one compressible solid spacer is positioned below the build platform; and
wherein the compressible solid spacer positioned above the build platform has a different size than the compressible solid spacer below the build platform.

33. A system, comprising:
an additive-manufacturing device comprising:
a build chamber;
a base adjustably coupled to the build chamber; and a build platform adjustably coupled to the base and configured to travel, relative to the base and perpendicular to the base;

wherein the base is separated from the build platform by pneumatic devices;

wherein at least one pneumatic device is positioned above the build platform and at least one pneumatic device is positioned below the build platform; and wherein the pneumatic device above the build platform has a different deformation factor than the pneumatic device below the build platform.

34. A system, comprising:

an additive-manufacturing device comprising:
- a build chamber;
- a base adjustably coupled to the build chamber;
- a build platform adjustably coupled to the base and configured to travel, relative to the base and perpendicular to the base; and
- at least a first motion-control device above the build platform, at least a second motion-control device below the build platform, the first motion-control device is different from the second motion-control device.

* * * * *